United States Patent Office 3,097,178
Patented July 9, 1963

3,097,178
VINYLIDENE CHLORIDE COPOLYMER LATEX CONTAINING OXYETHYLATED CASTOR OIL
Harold J. Townsend, Saginaw, and Dallas G. Grenley, Midland, Mich., assignors to The Dow Chemical Company, Midland, Mich., a corporation of Delaware
No Drawing. Filed Dec. 30, 1959, Ser. No. 862,777
13 Claims. (Cl. 260—23)

This invention relates to a method of producing mechanically stable latexes containing, as the disperse phase, copolymers of vinylidene chloride and certain ethylenically unsaturated compounds copolymerizable therewith. Particularly, it relates to the method of producing mechanically stable latexes possessing low foaming characteristics and excellent wetting properties.

Copolymers of predominant amounts of vinylidene chloride with at least one monomer of the group defined by acrylonitrile and the lower alkyl esters of acrylic and methacrylic acids are known to possess excellent resistance to oils, greases, chemicals generally, and water. Thin films of these materials display a very low rate of water vapor transmission. Because of this desirable combination of properties, the polymers in question find wide application in the field of protective coating. A particularly important application is in the packaging of foodstuffs, where low water vapor transmission is required. For such use the materials are generally employed as a coating on a paper or a cellophane base. The coating may be applied to the base by usual methods of depositing on the surface thereof a thin layer of either a solution of the copolymer in an organic solvent or of a latex of the copolymer and subsequently driving off the solvent of the solution or the aqueous portion of the latex. The solution coating method is relatively expensive in that it requires the use of solvents which in turn necessitates additional process steps for the recovery of the solvents. Furthermore, the use of solvents may present both fire and toxicological hazards. For these reasons, the latex coating method is generally preferred.

The latex coating method requires that the polymer latex possesses both mechanical stability, low surface tension, and low foaming characteristics. A variety of materials is available which are effective to increase the stability and the wetting ability of the latexes. Almost invariably, however, the agent used has the highly undesired effect of increasing the foamability of the latex. Foaming cannot ordinarily be tolerated in a coating operation inasmuch as it gives rise to pin holes in the protective coating.

It is, therefore, a principal object of the invention to provide latexes of the copolymers described which are broadly adaptable to the formation of a continuous film or protective coating. Additionally, it is an object of the invention to provide such latexes having good mechanical stability and low surface tension together with low foaming characteristics. Other and related objects will be evident from the following description.

According to the present invention, the above and related objects are attained by the addition to the latex of low emulsifier content of a small but effective amount of the product of the reaction between ethylene oxide and castor oil as a stabilizing and surface tension reducing agent. Specifically, the reaction between castor oil, which is principally the triglyceride of ricinoleic acid, and ethylene oxide involves the hydroxy group of the ricinoleic acid, the triglyceride structure being retained in the products. These polyoxyethylene derivatives of castor oil, which are commercially available, consist essentially of compounds having the general formula

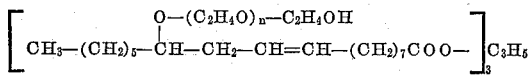

wherein the numerical value of $n$ depends on the amount of ethylene oxide that has reacted with the castor oil and $C_3H_5$ represents the glyceryl group. For use in the present invention the reaction product should contain at least 70 percent by weight of the ethylene oxide residue. When the ethylene oxide contributes only about 65 percent of the weight of the oxyethylated castor oil, the product is not sufficiently water soluble to significantly alter the surface tension of the latex to which it is added. However, when the contribution of ethylene oxide to the weight of the product amounts to at least 70 percent and does not exceed about 90 percent, the product is completely soluble in water and is effective to lower the surface tension of the latex to which it is added without causing the increase in foamability which attends the use of most surfactants. Products in which the amount of ethylene oxide residue is in excess of about 90 percent, while completely water soluble and capable of producing the desired lowering of surface tension, tend to produce the foaming of the latex that must be avoided in a coating application.

In the general formula above the value of $n$ for the material having an ethylene oxide content of 70 percent is approximately 16, while at an ethylene oxide content of 90 percent this value is approximately 62.

Latexes of low emulsifier content may advantageously be prepared by polymerization of the desired mixture of monomers in a redox catalyzed emulsion polymerization system in a manner as described in U.S. 2,462,422. Such latexes ordinarily possess adequate mechanical stability, but they are deficient in wetting ability and are therefore not generally suited to coating applications. The addition of surfactants to these latexes in an attempt to lower their surface tension almost invariably causes a marked decrease in mechanical stability. Frequently, this decrease in mechanical stability is of sufficient magnitude to cause coagulation. Furthermore, the addition of most surfactants normally has the added disadvantage of greatly increasing the foaming characteristics of the latex.

Latexes of this type to which oxyethylated castor oil has been added possess the requisite mechanical stability for use in the coating of paper by the usual methods of calendering or by application with a doctor blade. They exhibit a minimum tendency to foam formation and, as a result, pin hole development in the coating film is negligible. Additionally, the surface tension of such latexes is sufficiently low that they readily wet the substrate to which they are applied.

The copolymers which constitute the disperse phase of the latexes to be stabilized by the method of the invention are materials particularly suited to use in food packaging by virtue of their high vinylidene chloride content. Vinylidene chloride may constitute from about 60 percent by weight of the polymerizable mixture to about 94 percent of this weight. The balance of the polymerizable mixture may be acrylonitrile or a lower alkyl ester of either acrylic or methacrylic acid in which the alkyl group may contain from one to eight carbon atoms. It may also be a mixture of acrylonitrile and such ester, the relative proportions of the components of the mixture being a matter of choice dependent on the properties desired in the final film.

The oxyethylated castor oil may generally be used in the proportion of from about 0.2 percent to about 5 percent by weight of the polymer content of the latex. Preferably, there will be employed from about 0.5 percent to about 3 percent by weight of the weight of polymer. An amount of the oxyethylated castor oil from this preferred range will be found effective to provide the latex with excellent wetting properties without a concomitant and undesirtble increase in foaming characteristics or decrease in mechanical stability. The surfactant may conveniently be added to the latex in the form of an aqueous solution containing about 15 percent by weight of the material.

The invention is illustrated by the following examples, which are intended to be merely demonstrative and not limiting, and wherein all parts and percentages are on a weight basis.

Example 1

In 100 parts of water there were dissolved 0.5 part of potassium persulfate, 0.3 part of sodium bisulfite and 0.025 part of an alkyl aryl sulfonate wetting and emulsifying agent. This solution was placed in a glass lined pressure vessel fitted with an agitator. A mixture of 85 parts of vinylidene chloride, 10 parts of acrylonitrile and 5 parts of ethyl acrylate was introduced into the vessel and the free space of the vessel was flushed out with nitrogen. The contents were then agitated at 45° C. for a period of about two hours until a marked drop in the pressure in the vessel indicated completion of the reaction. The vessel was then cooled and vented and the latex removed.

The surface tension of the latex was determined and found to be 68 dynes per centimeter.

To 200 parts of the latex containing about 100 parts of polymer there was added sufficient ammonium hydroxide to bring the pH to a value of about 8.0. There were then added 3 parts of oxyethylated castor oil in which ethylene oxide constituted about 80 percent of the weight of the product. This was added as a solution in water of 15 percent concentration of the surfactant. The surface tension of the thus treated latex was determined and found to be 39 dynes per centimeter.

Example 2

The mechanical stability of the treated latex was measured by placing 200 cc. of the latex in a cylindrical container approximately 4 inches in diameter and subjecting it to the stirring action of a Hamilton Beach Beverage Mixer (Model 30) at a speed of approximately 18,000 revolutions per minute. This stirring was continued for one hour during which period only a negligible amount of foam was formed. The latex was then filtered through a fine mesh fabric. No coagulum was obtained.

Example 3

In 100 parts of water there were dissolved 0.5 part of potassium persulfate and 2.5 parts of an alkyl aryl sulfonate emulsifying agent. To this solution, contained in the glass lined pressure vessel, there were added 100 parts of the monomeric mixture employed in Example 1. Emulsion polymerization was carried out as in Example 1 to obtain a latex containing about 50 percent of polymer.

Following the procedure of Example 2, the mechanical stability of the latex was determined. Complete coagulation occurred within a 5 minute period of stirring. Furthermore, foam was produced equal in volume to about 4 volumes of latex used.

Example 4

To a portion of the latex of Example 3 there were added 2.0 parts of alkyl aryl sulfonate to give a total emulsifier content of 4.5 parts per 100 parts of polymer in the latex. When subjected to high speed stirring in the mechanical stability test the thus stabilized latex coagulated completely in about 30 minutes. During the stirring there was produced a volume of foam equal to approximately 6 times the original liquid volume.

Example 5

Following the procedure of Example 1 latexes were prepared using the aqueous phase described in that example and the following mixtures of monomers:

(a) Vinylidene chloride (90 parts), acrylonitrile (10 parts)
(b) Vinylidene chloride (80 parts), methyl acrylate (10 parts), butyl acrylate (10 parts)
(c) Vinylidene chloride (85 parts), acrylonitrile (13 parts), octyl acrylate (2 parts)
(d) Vinylidene chloride (70 parts), methyl acrylate (20 parts), ethyl acrylate (10 parts)
(e) Vinylidene chloride (60 parts), methyl acrylate (30 parts), acrylonitrile (10 parts)

The surface tension of each of these latexes was determined. In all cases values in excess of 65 dynes per centimeter were obtained.

Example 6

To each of the latexes of Example 5 there were added 3 parts of the oxyethylated castor oil employed in Example 1 as a solution in water. In each case the addition of the surfactant brought about a lowering of the surface tension to a value of less than 40 dynes per centimeter.

Example 7

Each of the latexes of Example 6, containing 3 parts of oxyethylated castor oil per 100 parts of polymeric product, were subjected to high speed stirring in the mechanical stability test for a period of a full hour. Only negligible foam formation was observed. Filtration of the latexes through a fine mesh cloth indicated the complete absence of coagulum.

Example 8

A small amount of the untreated latex of Example 1 was poured on a smooth surface of polystyrene and spread out into a film by wiping with a doctor blade. The film broke immediately after being formed and the latex gathered into small droplets on the surface.

Example 9

To the latex of Example 8 there was added 0.2 part of the oxyethylated castor oil of Example 1 per 100 parts of polymer. This latex was wiped on the polystyrene surface as described above. A film formed, which broke in several places to reveal the polystyrene surface. However, gathering of the latex into small droplets did not occur. Drying gave a broken film.

Example 10

Example 8 was repeated employing the latex to which had been added 0.5 part of oxyethylated castor oil. A non-broken wet film was obtained. Drying of this wet film gave a continuous sheet of the polymeric material.

What is claimed is:

1. A method for the preparation of a synthetic resinous copolymer latex having low foaming characteristics and adapted to the deposition of a continuous film therefrom comprising copolymerizing in a redox catalyzed emulsion polymerization system of low emulsifier content a polymerizable mixture of from about 60 to about 94 weight percent of vinylidene chloride and from about 40 to about 6 weight percent of at least one other ethylenically unsaturated material that is copolymerizable therewith to form a latex having a surface tension not substantially lower than about 68 dynes per centimeter, and adding to the resulting latex from about 0.2 to about 5.0 parts by weight, on the basis of 100 parts by weight of the copolymer contained in the latex, to reduce the surface tension of said latex to a value not exceeding 50 dynes per centimeter, of a compound of the general formula

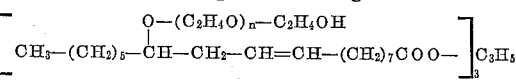

wherein $n$ has a numerical value of from 16 to 62.

2. A method for the preparation of a synthetic copolymer latex having low foaming characteristics and adapted to the deposition of a continuous film therefrom comprising copolymerizing in a redox catalyzed emulsion polymerization system of low emulsifier content a polymerizable mixture of from about 60 to about 94 percent by weight of vinylidene chloride and from about 40 to about 6 percent by weight of at least one member of the group consisting of acrylonitrile, lower alkyl esters of acrylic acid and lower alkyl esters of methacrylic acid to form a latex having a surface tension not substantially lower than about 68 dynes per centimeter and adding to the resulting latex from about 0.2 part to about 5.0 parts by weight, on the basis of 100 parts by weight of the copolymer contained in the latex, to reduce the surface tension of said latex to a value not exceeding 50 dynes per centimeter, of a compound of the general formula

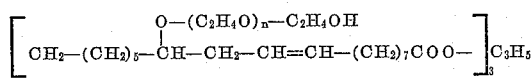

wherein $n$ has a numerical value of from 16 to 62.

3. The method according to claim 2, wherein the vinylidene chloride constituted from about 80 percent to about 90 percent by weight of the polymerizable mixture.

4. The method according to claim 2, wherein the polymerizable mixture comprises a mixture of about 85 percent by weight of vinylidene chloride, about 10 percent by weight of acrylonitrile and about 5 percent by weight of a lower alkyl ester of acrylic acid.

5. The method according to claim 2, wherein the polymerizable mixture comprises a mixture of about 85 percent by weight of vinylidene chloride, about 10 percent by weight of acrylonitrile and about 5 percent by weight of butyl acrylate.

6. The method according to claim 2, wherein the polymerizable mixture comprises a mixture of about 85 percent by weight of vinylidene chloride, about 10 percent by weight of acrylonitrile and about 5 percent by weight of octyl acrylate.

7. The method according to claim 2, wherein the polymerizable mixture comprises a mixture of about 90 percent by weight of vinylidene chloride and about 10 percent by weight of acrylonitrile.

8. The method according to claim 2, wherein the polymerizable mixture comprises a mixture of about 90 percent by weight of vinylidene chloride and about 10 percent by weight of methyl acrylate.

9. A latex prepared according to the method of claim 2.

10. A latex prepared according to the method of claim 5.

11. A latex prepared according to the method of claim 6.

12. A latex prepared according to the method of claim 7.

13. A latex prepared according to the method of claim 8.

References Cited in the file of this patent

UNITED STATES PATENTS

| | | |
|---|---|---|
| 2,462,422 | Plambeck | Feb. 22, 1949 |
| 2,538,737 | Stanton et al. | Jan. 16, 1951 |
| 2,828,224 | Alps et al. | Mar. 25, 1958 |
| 2,835,595 | Salatiello | May 20, 1958 |

FOREIGN PATENTS

| | | |
|---|---|---|
| 694,178 | Germany | July 27, 1940 |